J. V. PUGH.

DETACHABLE WHEEL

APPLICATION FILED FEB. 28, 1921

Reissued May 16, 1922.

15,357.

3 SHEETS—SHEET 1.

John Vernon Pugh
By Clarence S. Walker
His Attorney

J. V. PUGH.

DETACHABLE WHEEL.

APPLICATION FILED FEB. 28, 1921.

Reissued May 16, 1922.

15,357

3 SHEETS—SHEET 2.

John Vernon Pugh
By Clarence S. Walker
His Attorney

J. V. PUGH.

DETACHABLE WHEEL.

APPLICATION FILED FEB. 28, 1921.

Reissued May 16, 1922.

15,357.

3 SHEETS—SHEET 3.

John Vernon Pugh
By Clarence S. Walker
His Attorney

UNITED STATES PATENT OFFICE.

JOHN VERNON PUGH, OF COVENTRY, ENGLAND, ASSIGNOR, BY MESNE ASSIGNMENTS, TO WIRE WHEEL CORPORATION OF AMERICA, A CORPORATION OF NEW YORK.

DETACHABLE WHEEL.

15,357. Specification of Reissued Letters Patent. Reissued May 16, 1922.

Original No. 1,296,316, dated March 4, 1919, Serial No. 681,760, filed March 5, 1912. Application for reissue filed February 28, 1921. Serial No. 448,590.

*To all whom it may concern:*

Be it known that I, JOHN VERNON PUGH, a subject of the King of Great Britain and Ireland, and residing at Guiting House, Allesley, Coventry, in the county of Warwick, England, have invented certain new and useful Improvements in and Relating to Detachable Wheels, of which the following is a specification.

This invention relates to detachable wheels of the type in which an outer or detachable hub part is sleeved upon and engaged so as to revolve with an inner or permanent hub part being held thereon by means of a nut part or equivalent screwed member.

The object of the invention is to render the securing of the nut or screwed member which holds the outer upon the inner hub part independent of the action of the ratchets or other additional locking device, which have hitherto been regarded as essential in practice to insure safety.

It is well known that if two solids of revolution, cylinders, cones, screw-threaded cylinders or the like are put together one inside the other the inner one must be smaller than the outer one and consequently must be of shorter circumference and under conditions that keep the two parts in contact at one fixed point and substantially out of contact at the diametrically opposite fixed point, if either of the two parts be revolved then the other part will revolve also and the speeds of revolution of the two parts will be proportional inversely to the relative lengths of their circumferences the inner part revolving faster than the outer part.

The invention consists in applying this principle so as to obtain automatic retention of detachable outer hub parts on inner hub parts indiscriminately on either side of a vehicle.

The invention also consists in the improvements in detachable wheels as hereinafter indicated.

Referring now to the accompanying drawings:—

Figure 1:
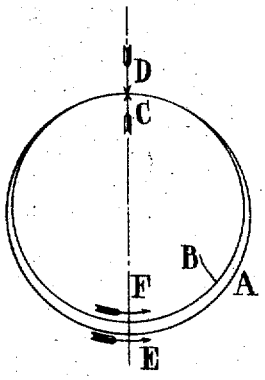
Figure 1 is a diagram illustrating the principle upon which the invention is based.
Figure 6:
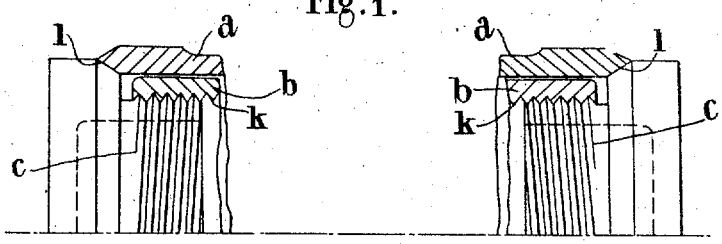
Figure 6 is an enlarged fragmental section of the ends of the wheel hubs upon each side of a vehicle.

In Figure 1 the circles A—B represent the cross section of two solids of revolution fitting the one within the other, the necessary clearance being exaggerated for the sake of clearness. If these two bodies are pressed together in a vertical direction as indicated by the arrows C—D and the one A is revolved in the direction of the arrow E, then the other B will be driven by it and will revolve as indicated by the arrow F, but at a higher speed of revolution in the ratio of the diameter A to the diameter B.

When applying the foregoing to a detachable wheel hub construction, the nut part which is provided with circumferential engaging surfaces forming solids of revolution has each pressed by the weight of the car tightly in contact with one of two other solids of revolution in the shape of the engaging surfaces of the inner and outer parts, the two former having of necessity the same angular velocity when revolving. The nut part will during joint revolution of the parts tend to move forward or backward relative to either one of the two hub parts according to whether it is in contact with an internally disposed or an externally disposed circumferential engaging surface thereof, so that if it engages a similarly disposed surface of each hub part its motion is the result of the sum of the frictional driving effect of both. If, on the other hand, a nut part is formed to be in contact with an internally disposed surface of one hub part and an externally disposed surface of the other, then the two frictional driving effects will be opposed to one another and the motion of the nut part is the result of their difference. According to a third alternative, the frictional driving effect of one of the hub parts may be practically eliminated by arranging friction reducing means between its circumferential engaging surface and the corresponding engaging surface of the nut part.

The present application describes only cases of the first type in which the movement of the nut is the result of the sum of the two driving effects acting in the same direction. The other cases are described in applications Serial Nos. 710481 and 719207.

Figure 3:
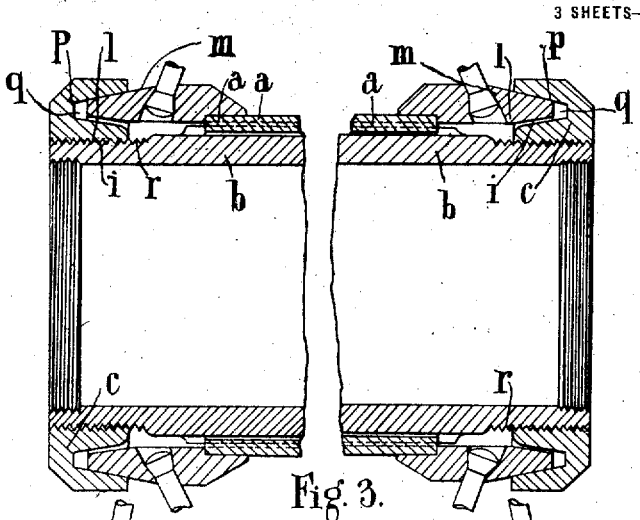
Figure 3 shows the outside ends of a pair of wheel hubs for use on opposite sides of a vehicle to which this invention is applied.

In carrying this invention into effect in one form, as shown by way of example in Figure 3, an outer hub part, *a*, is mounted upon an inner hub part, *b*, some usual known form of engaging means such as serrations or the like, being provided so that the two parts rotate together. A moderately coned centering abutment is provided at the inside end of the inner hub and the outside end of the inner hub part is made to project beyond the end of the outer hub part, and is provided with an externally facing screw thread, *r*. The external surface, *m*, of the end of the outer hub part is made of a slightly tapered conical form the smaller diameter being at the outside end. The nut, *c*, screws upon the thread, *r*, provided on the inner hub part, and has a circular V-shaped groove, *q*, on its inner side, one surface of the groove bears upon the coned surface *m*, of the end of the outer hub part while the surfaces, *i* and *l*, are so arranged that they cannot come into contact. The ordinary clearance between the inner and outer hub parts which is found necessary to insure an easy attachment and removal of the detachable parts of the wheels is such that when the lock nut is screwed up, a vertical force due to gravity will be transmitted through the lock nut from one hub part to the other. The contact between the inner hub part and the nut will have the tendency to make the latter rotate at a slower speed than the former, owing to the property already described and there will also be, due to the contact between the nut and the outer part, a tendency for the former to revolve at a slower speed than the latter. The inner and outer hub parts being rotationally locked together by the before mentioned engaging means, and the tendency to relative movement of the nut with regard to both of them being the same, it will be clear that by suitably arranging the hand of the thread employed, the nut may be caused constantly to screw up or on to the inner hub part, and there will be no tendency for it to unscrew or become loose.

If a right handed thread is employed upon the left hand side of the vehicle, and a left handed thread upon the right hand side, the nuts on both sides will always tend to tighten up and remain in position upon their respective inner hubs.

Figure 4:
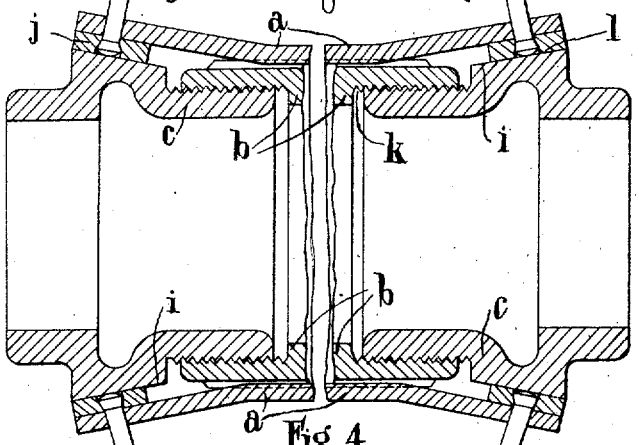
Figure 4 shows another way of carrying the invention into effect.

In carrying the invention into effect in a modified form, shown in Figure 4, the outer hub part, *a*, is made to project beyond the end of the inner hub part, *b*, and its outside end, *j*, is slightly coned or bell-mouthed. The inner hub part, *b*, is provided with an internal screw-thread, *k*, and the nut, *c*, is formed with an enlarged conical part, *l*, which fits within the bell-mouthed portion, *j*, and engages the surfaces *l* of the outer hub part, the inside end of the nut, screwing into the internal thread, *k*, of the inner hub part.

By this arrangement it is again possible to cause the tendencies to relative movement of the nut to be the same as regards direction with regard to both the inner and outer hub parts, due to the nature of its contact therewith, the nut tending to revolve faster than both hub parts and to remain in its screwed up position as before described; in this case a left hand thread is provided on the left hand side of the vehicle and a right hand thread on the right hand side.

Figure 5:
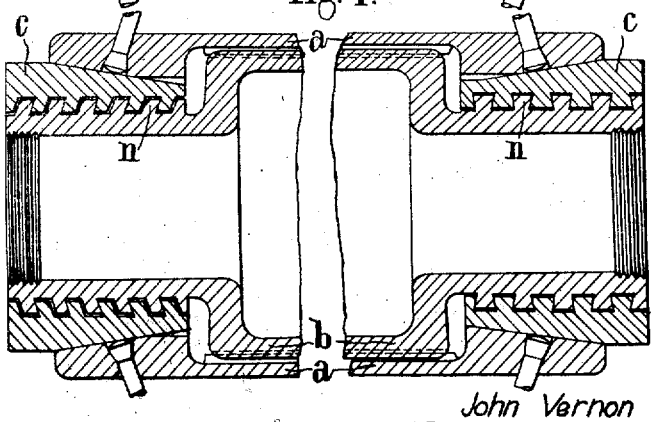
Figure 5 shows a modified form of screw thread.

In a further modification shown in Figure 5, the inner hub part, *b*, is provided with an external thread, *n*, of undercut or dovetail form, upon which the nut screws. There is a clearance provided between the horizontal portions of the screw thread, so that the nut comes into contact with the thread only upon the inclined or undercut surfaces, which form of contact is of the same nature as an internal thread. The outside end of the outer hub part is bell-mouthed, as in the previous modification, and the nut is provided with an enlarged end which fits within this bell-mouth. In this way it will be again clear that the contact with the inner and outer hub parts both produce the same effect upon the nut, and by the use of suitably handed threads which will be the same in the last arrangement, this effect may be made to keep the nuts screwed up in position, as previously described.

Figure 2:
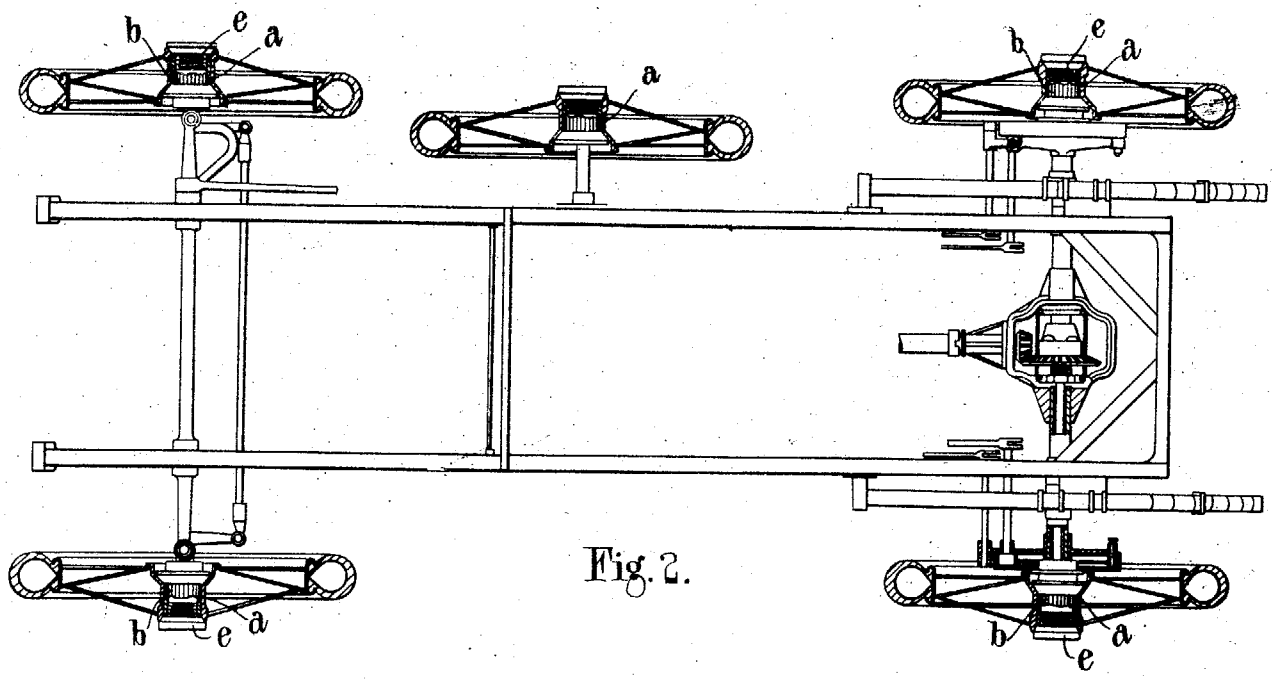
Figure 2 is a plan of a motor car to which this invention is applied, fitted with four detachable wheels and carrying a spare wheel part interchangeable with any one of the four.

In carrying this invention into effect in one form as shown by way of example in Figures 2 and 3, the action is the same as described in connection with Figure 4; if in this case a right hand thread is employed upon the right hand side of the vehicle, and a left handed thread upon the left hand side, the lock nuts on both sides will always tend to tighten up and to remain in position with regard to their respective inner hubs.

I have found by experiment that the tightening up of the lock nut will continue until the outer hub part is more nearly concentric with the inner hub part and the pressure between the contacting surfaces is so great that the additional force of gravity is not sufficient to produce much difference in the disposition of the lock nut relative to the hub parts, and that when this has taken place reversal of the vehicle to a far greater extent than is customary does not loosen the wheels.

Figure 7:
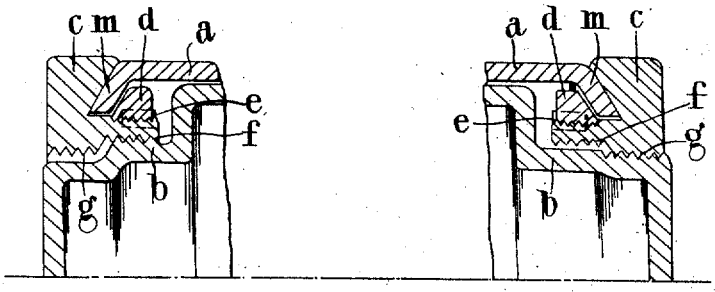
Figure 7 is a similar drawing to Figure 6 but showing a modified form of the invention.

In the form of the invention already described, it will be seen that the lock nuts, as well as the inner hub parts for opposite sides of a vehicle, are dissimilar to one another having a right hand thread on one side of the vehicle and a left hand thread on the other; a nut cannot therefore be attached to and carried about by the outer hub of the wheel which is applicable to either side of the vehicle, but in a modified form of the invention as shown in Figure 7, the lock nut *c* is retained in connection with the outer hub part *a* by the withdrawal ring *d* which is kept from loosening by the grub screw *e*.

The lock nut when tightened up abuts against an external coned surface *m* formed at the end of the outer hub part and it is provided with a portion of a right hand thread *f* and a portion of a left hand thread *g*, which portions are of different diameters and can engage external threads of the correct hand provided on the inner hub parts on opposite sides of the vehicle, so that in this instance only the inner hub parts are dissimilar to one another for opposite sides of a vehicle and the outer hub parts and nuts are alike on both sides. The lock nut in this modification is external to the surfaces of revolutions with which it contacts on both the inner and outer hub parts, and it will in accordance with the principle already described, revolve at a slightly slower speed than the hub parts during joint revolution. If the inner hub parts are provided with a right hand thread on the left hand side of the vehicle and a left hand thread on the right hand side, the lock nuts will always be tightened up and retained in position. The right hand thread *f* is made of such a diameter that it will pass over the left hand thread on the inner hub part without engaging therewith.

As stated in describing the form of the invention shown in Figure 4, a lock nut which engages with internal surfaces of the hub parts requires a right hand thread upon the right hand side of the vehicle, while in describing Figure 3 it is shown that the one that contacts with external surfaces engages with a right hand thread upon the left hand side of the vehicle. If therefore the internal type of lock nut is employed upon one side of the vehicle, and the external type upon the other side, the screw threads may be of the same hand upon both sides of the vehicle and thus any confusion in tightening or unscrewing the lock nuts upon opposite sides will be avoided. In this case one spare interchangeable wheel part may be provided with abutment surfaces suitable for engagement by both types of lock nut, and so be applicable to either side of the vehicle.

It will be seen that by the use of this invention a spare wheel part which is interchangeable with any of the like detachable wheel parts of a vehicle is automatically and safely retained in position as soon as the lock nuts have been screwed up, and that no spring or hand operated pawls or catches with the attendant ratchet teeth or castellations are necessary to prevent the lock nut from working loose. Further, any ordinary spanner of the correct size may be used for the lock nut and no special pawl releasing devices are required; the spanner may also be instantly applied to the lock nut for tightening or unscrewing without the previous manipulation of any catches or pawls; it is therefore fool-proof.

It will also be clear that many modifications may be made in this invention and in the manner of carrying it into effect without in any way departing from the spirit of the same.

Having now described my invention, what I claim as new and desire to secure by Letters Patent is:—

1. In combination in a detachable wheel two hub parts sleeved and connected to revolve together but subject to slight eccentric displacement, a circular nut subjected during said displacement to opposed radial forces imposed by said hub parts upon diametrically opposite sides of the axis, whereby said nut rotates relative to said parts during joint revolution, and screw threads so handed that the relative rotation tightens up the nut during forward movement.

2. In combination in vehicle wheels an inner hub part for the right-hand side of a vehicle, an inner hub part for the left-hand side, an outer hub part which can be sleeved indiscriminately upon either inner hub part, means ensuring simultaneous revolution of the outer and an inner hub part when sleeved one upon the other but permitting a substantially uniform eccentric displacement of their axes in the same direction during revolution under tortional stress, a nut part for retaining the outer hub part upon each inner hub part, a pair of complementary circumferential surfaces whereby a nut part and an inner hub part engage one another and a pair of such surfaces whereby a nut part and an outer hub part engage one another, said surfaces being so disposed that a nut part transmits radial force while retaining one hub part upon the other and due to the eccentric displacement also undergoes angular displacement relative to said two hub parts during revolution of a wheel, at least one of said pairs of surfaces being screw-threaded and at least one pair for the right hand side differing from an equivalent pair for the left-hand side, so that relative angular displacement during forward movement of a vehicle will tighten up a nut upon each side.

3. In combination in vehicle wheels an inner hub part for the right hand side of a vehicle, an inner hub part for the left hand side, an outer hub part which can be sleeved indiscriminately upon either inner hub part, means comprising complementary torque transmitting abutment surfaces having abrupt angular deflections for ensuring simultaneous revolution of an outer and inner hub part when sleeved one upon the other but permitting a substantially uniform eccentric displacement of their axes in the same direction during revolution under torsional stress, a nut part for retaining the outer hub part upon each inner hub part, a pair of complementary circumferential surfaces whereby a nut part and an inner hub part engage one another, and a pair of such surfaces whereby a nut part and an outer hub part engage one another, said surfaces being so disposed that a nut part transmits radial force while retaining one hub part upon the other and due to the eccentric displacement also undergoes angular displacement relative to said two hub parts during revolution of a wheel, at least one of said pairs of surfaces being screw-threaded and at least one pair for the right hand side differing from an equivalent pair for the left hand side, so that relative angular displacement during forward movement of a vehicle will tighten up a nut upon each side.

4. In combination an inner hub part for the right hand side and one for the left hand side of a vehicle, an outer hub part which can be sleeved indiscriminately upon either of said inner hub parts, complementary torque transmitting abutment surfaces having abrupt angular deflections for ensuring simultaneous revolution of an inner and the outer hub part when sleeved together, while permitting substantially equal eccentric displacement of their axes at all periods of a revolution and a nut part upon each side to retain each outer hub part upon its inner hub part and subjected thereby to opposed radial forces which result in an automatic tightening of the nuts upon each side of a vehicle during the forward movement thereof.

5. In combination in vehicle wheels an inner hub part for the right hand side of a vehicle, an inner hub part for the left hand side, an outer hub part which can be sleeved indiscriminately upon either inner hub part, means preventing any substantial angular play in one part upon the other when loosely sleeved one upon the other but permitting a substantially uniform eccentric displacement of their axes in the same direction during revolution under torsional stress, a nut part for retaining the outer hub part upon each inner hub part, a pair of complementary circumferential surfaces whereby a nut part and an inner hub part engage one another, and a pair of such surfaces whereby a nut part and the outer hub part engage one another, said surfaces being so disposed that a nut part transmits radial force while retaining one hub part upon the other and due to the eccentric displacement also undergoes angular displacement relative to said two hub parts during revolution of a wheel, at least one of said pairs of surfaces being screw-threaded and at least one pair for the right hand side differing from an equivalent pair for the left hand side, so that relative angular displacement during forward movement of a vehicle wheel tightens up a nut upon each side.

6. In combination an inner hub part for the right hand side and one for the left hand side of a vehicle, screw-threads on both said parts and dissimilar for the two sides, an outer hub part indiscriminately fitting upon either inner hub part, with means preventing any substantial angular play of one part upon the other when loosely engaged, and nuts provided with screw-threads complementary to the two dissimilar threads of said inner hub parts for securing by automatic differential frictional tightening action an outer hub part to an inner hub part on either side of the vehicle.

7. In combination in a wheeled vehicle, an axle, inner hub parts of demountable wheels fitted to each end thereof, outer hub parts sleeved upon said inner hub parts, nut parts retaining said outer upon said inner hub parts and complementary surfaces one at least of which is screw-threaded, whereby each nut engages both of its associated hub parts and during joint revolution executes angular movement relative thereto, said surfaces being in at least one respect differently formed at each end of said axle whereby automatic tightening of both nuts during forward movement of the vehicle is secured.

8. In combination in a wheeled vehicle, an axle, inner hub parts of demountable wheels fitted to each end thereof, outer hub parts sleeved upon said inner hub parts with means preventing substantial angular displacement when loosely engaged, nut parts retaining said outer upon said inner hub parts and complementary surfaces one at least of which is screw-threaded, whereby each nut engages both of its associated hub parts and during joint revolution executes angular movement relative thereto, said surfaces being in at least one respect differently formed at each end of said axle, whereby automatic tightening of both nuts during forward movement of the vehicle is secured.

9. In combination in a wheeled vehicle, an axle, inner hub parts of demountable wheels fitted to each end thereof, outer hub parts sleeved upon said inner hub parts, nut parts retaining said outer upon said inner hub parts and complementary surfaces one at least of which is screw-threaded, whereby each nut engages both of its associated hub parts upon circumferentially distant radii and during joint revolution executes angular movement relative thereto, said surfaces being in at least one respect differently formed at each end of said axle, whereby automatic tightening of both nuts during forward movement of the vehicle is secured.

10. In a detachable wheel the combination of an inner hub part, an outer hub part mounted on said inner hub part to revolve therewith but subject to a slight eccentric displacement, and a nut pressed tightly in contact with both said eccentrically displaced hub parts and given a rotative movement by the driving effect from both said parts, said nut engaging a similarly disposed surface of each hub part so that the rotative movement transmitted to said nut is the sum of the driving effects of both parts acting in the same direction.

11. In a detachable wheel the combination of an inner hub part, an outer hub part mounted on said inner hub part to revolve therewith but subject to a slight eccentric displacement, and a nut having one surface contacting one side of said inner hub part and a second surface contacting a similarly disposed side of said outer hub part whereby said nut has a tendency to rotate relatively to both said hub parts, one of said surfaces and its contacting hub part having a suitably arranged threaded engagement so that the relative rotation of the nut and hub parts tends to tighten up the nut during the forward movement of the wheel.

12. In a detachable wheel the combination of an inner hub part, an outer hub part mounted on said inner hub part to revolve therewith but subject to a slight eccentric displacement, and a nut having one surface contacting one side of said inner hub part and a second surface contacting a similarly disposed side of said outer hub part whereby said nut has a tendency to rotate relatively to both said hub parts, one of said surfaces and its contacting hub part being tapered and the other of said surfaces and its contacting hub part having a suitably arranged threaded engagement so that the relative rotation of the nut and hub parts tends to tighten up the nut during the forward movement of the wheel.

13. In a detachable wheel the combination of an inner hub part, an outer hub part mounted on said inner hub part to revolve therewith but subject to slight eccentric displacement, and a nut having one surface contacting one side of said inner hub part and a second surface contacting a similarly disposed side of said outer hub part whereby said nut has a tendency to rotate relatively to both said hub parts, the nut and inner hub part contacting surfaces having suitably arranged threaded engagement so that the relative rotation of the nut and hub parts tends to tighten up the nut during the forward movement of the wheel.

14. In a detachable wheel the combination of an inner hub part, an outer hub part mounted on said inner hub part to revolve therewith but subject to slight eccentric displacement and a nut having one surface contacting one side of inner hub part and a second surface contacting a similarly disposed side of said outer hub part whereby said nut has a tendency to rotate relatively to both said hub parts, the nut and outer hub part contacting surfaces being tapered and the nut and inner hub part contacting surfaces having a suitably arranged threaded engagement so that the relative rotation of the nut and hub parts tends to tighten up the nut during the forward movement of the wheel.

15. In a detachable wheel the combination of an inner hub part, an outer hub part mounted on said inner hub part to revolve therewith but subject to slight eccentric displacement, said inner hub part having its outer end threaded and said outer hub part having its outer end tapered and a nut having a threaded surface to engage the threaded end of said inner hub part and a tapered surface to engage the tapered end of outer hub part, both threaded and tapered surfaces of said nut being similarly disposed, whereby said nut has a tendency to rotate relatively to both hub parts, said tendency being the sum of the driving effects between the nut and inner hub part and the nut and outer hub part in the same direction.

16. In a detachable wheel the combination of an inner hub part, an outer hub part mounted on said inner hub part to revolve therewith but subject to slight eccentric displacement, said inner hub part having its outer end externally threaded, said outer hub part having its outer end externally tapered, and a nut having an internal threaded surface to engage the externally threaded end of said inner hub part, and an internally tapered surface to engage the externally tapered end of the outer hub part whereby said nut has a tendency to rotate relatively to both hub parts, said tendency being the sum of the driving effects between the nut and inner hub part and the nut and outer hub part in the same direction.

17. In a detachable wheel the combination of an inner hub part having an externally screw-threaded outer end, an outer hub part mounted on said inner hub part, means insuring simultaneous rotation of said parts but permitting eccentricity of their axes, and a nut having an internally screw-threaded surface engaging the screw-threaded end of said inner hub and an internal surface engaging the outer side of the end of said outer hub part.

18. In a detachable wheel the combination of an inner hub part, an outer hub part mounted on said inner hub part, a coned abutment at the inside end of said inner hub part on which said outer hub part rests, means insuring simultaneous rotation of said parts but permitting eccentricity of their axes, the outer end of said inner hub part having an externally facing screw thread, and a nut having an internally screw-threaded part engaging the outer end of said inner hub part and provided with a circular groove on the inner side into which the outer end of said outer hub part projects with the nut contracting with the outer side of said hub part.

19. In combination an inner hub part of a detachable wheel for the right side of a vehicle, an outer part sleeved on said inner part, means insuring simultaneous revolution of said parts but permitting eccentricity of their axes, a circumferential engaging surface to each of said parts, at least one of said surfaces being screw-threaded, a nut part, circumferential engaging surfaces to said nut, complementary to said hub surfaces whereby it transmits radial forces while retaining one part upon the other and due to eccentricity rotates relative to said parts during revolution of the wheel, and three parts of a wheel for the left side of a vehicle equivalent to the aforesaid and with the outer and nut parts interchangeable with said right hand outer and nut parts but with engaging surfaces so differentiated that the relative rotation upon forward movement of a vehicle tightens the nut upon each side.

20. In combination an inner hub part for the right hand side and one for the left hand side of a vehicle, screw threads in connection with said parts, and dissimilar for the two sides, an outer hub part indiscriminately fitting upon either inner part, and screw threads in connection with said outer part complementary to the two dissimilar threads of said inner parts.

21. In combination an inner hub part for the right hand side and one for the left hand side of a vehicle, screw threads on both said parts and dissimilar for the two sides, an outer hub part indiscriminately fitting upon either inner hub part, and a nut provided with two sets of screw threads complementary to the two dissimilar threads of said inner hub parts for securing said outer hub part to an inner hub part on either side of the vehicle.

In testimony whereof I have signed my name to this specification.

JOHN VERNON PUGH.